April 9, 1957
H. F. TAYLOR
2,788,174
SLIDE RULE
Filed July 24, 1953
2 Sheets-Sheet 1
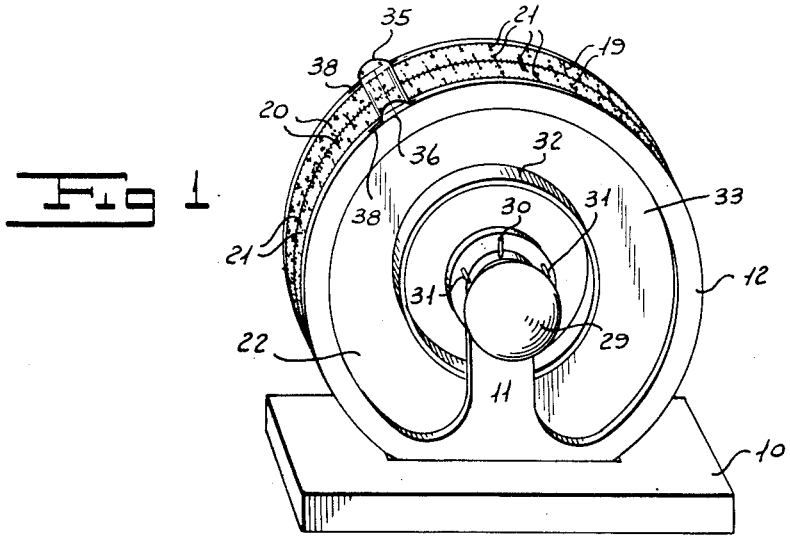
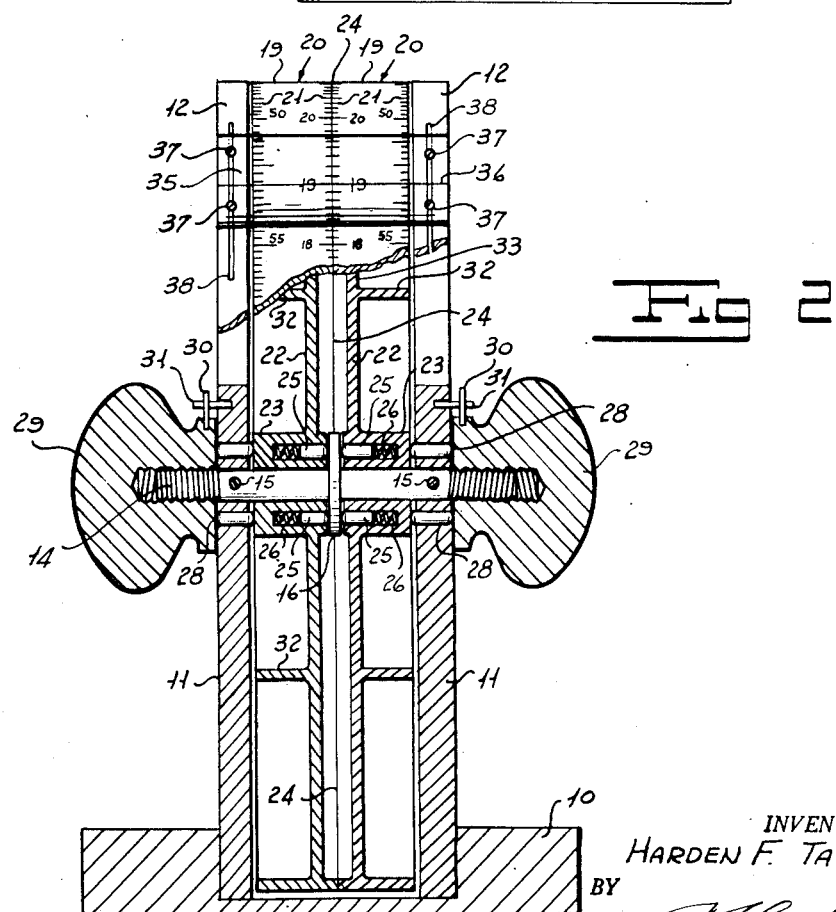
INVENTOR.
HARDEN F. TAYLOR
BY
ATTORNEY April 9, 1957    H. F. TAYLOR    2,788,174
SLIDE RULE
Filed July 24, 1953    2 Sheets-Sheet 2
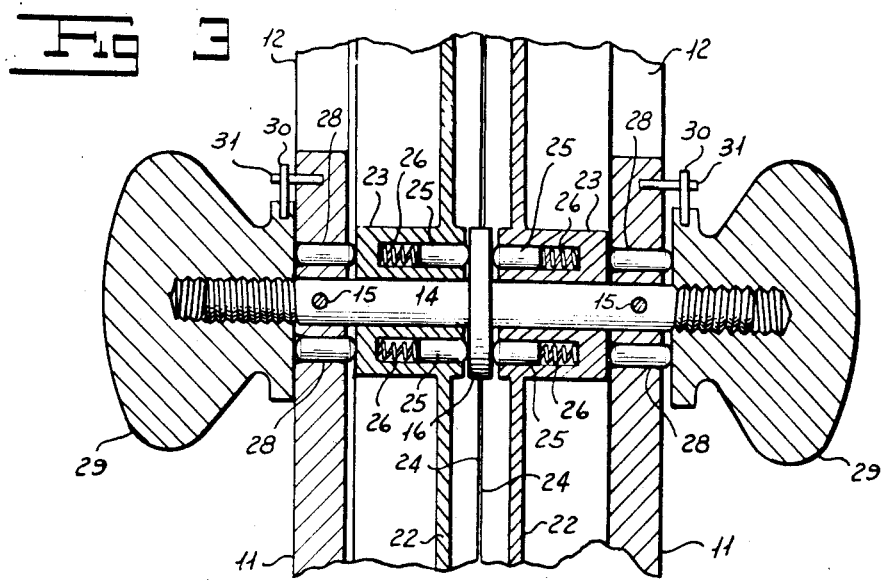
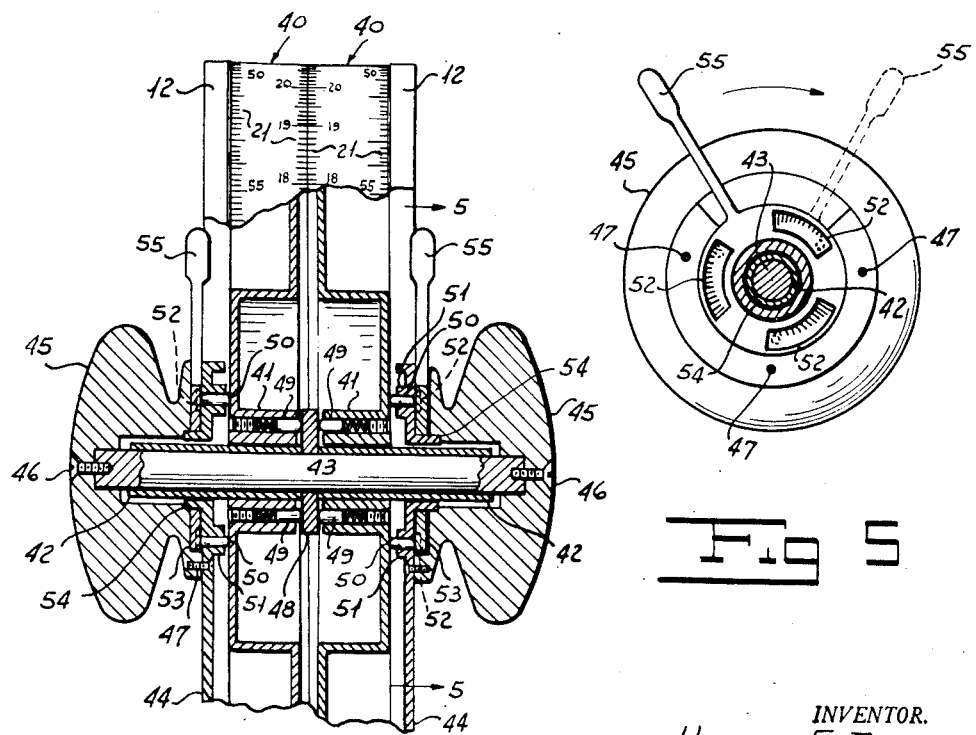
INVENTOR.
HARDEN F. TAYLOR
BY
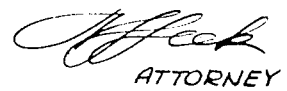
ATTORNEY United States Patent Office 2,788,174
Patented Apr. 9, 1957

2,788,174
SLIDE RULE

Harden F. Taylor, New York, N. Y.

Application July 24, 1953, Serial No. 370,007

11 Claims. (Cl. 235—79.5)

This invention relates to circular slide rules of the rotating drum type and has for an object to provide such a slide rule having novel and improved details of construction and features of operation.

Another object is to provide a slide rule of the above type which may be operated with either hand and from either side of the slide rule.

Another object is to provide a slide rule of the above type having a pair of rotating drums which are arranged to be operated either individually or in unison as desired by an operator using only one hand.

Another object is to provide a rotary slide rule, mounted on shaft, bearings, and base, with reading points always in the natural line of vision of the operator, in which all the working parts are disposed in radial symmetry about a common axis, and all parts are disposed in bilateral symmetry with respect to a median vertical plane so that an operator may perform all operations with either hand at will with equal speed and facility, leaving the other hand free for writing, holding telephone, etc.

It is also an object of the invention to provide such an instrument without unsightly gears, racks, pinions, toggles, clutches, springs, etc. and which presents a neat, trim, and artistic appearance.

It is a still further object to provide an instrument of such simple design and small number of parts that its manufacture can be most economically accomplished.

Various other objects and advantages will be apparent as the nature of the invention is more fully disclosed.

The nature of the invention will be better understood by referring to the following description, taken in connection with the accompanying drawings forming a part hereof, in which certain specific examples have been set forth for purposes of illustration.

In the drawings:

Fig. 1 is a perspective view of a circular slide rule embodying the present invention;

Fig. 2 is a partial vertical transverse section through the slide rule of Fig. 1 illustrating the mounting for the rotary drums and showing the drums in engagement for operation in unison;

Fig. 3 is a partial section similar to Fig. 2 but on a larger scale showing the drums separated for individual operation;

Fig. 4 is a partial sectional view similar to Fig. 2 illustrating another embodiment of the invention; and Fig. 5 is a section taken on the line 5—5 of Fig. 4 showing the details of the drum release mechanism.

Referring to the drawings more in detail, the invention is shown in Figs. 1 to 3 as embodied in the slide rule having a base 10 carrying supporting standards 11 and annular members 12 which are shown in Fig. 1 as unitary although they may be made as separate elements if desired. A stationary shaft 14 is secured in the standards 11, as by pins 15, and extends axially of the annular members 12. A flange 16 is rigidly attached to the midpoint of the shaft 14. The flange 16 may comprise a disc which is secured to the shaft or may be made integral with the shaft 14.

A pair of drums 20 having peripheral surfaces 19 carrying slide rule scales 21 are formed with central webs 22 and hubs 23 which are journaled for rotation on the shaft 14 on opposite sides of the flange 16. The peripheral surfaces 19 of the drums 20 register with or lie slightly below the peripheral surfaces of the annular members 12. Sufficient axial clearance is provided to permit a slight axial movement of the drums on the shaft 14. The hubs 23 are designed to have a clearance with the flange 16 when the adjacent edges 24 of the drums 20 are brought into contact by axial movement of both drums along the shaft 14.

The hubs 23 are normally urged axially away from said flange 16 by plungers 25 secured in recesses in said hubs 23 and pressed by springs 26 against the two side surfaces of the flange 16. In addition to tending to retract the drums 20 from their advanced positions the spring-pressed plungers 25 also exert a friction drag to hold the drums in any set position when the drums are not being turned by the operator. Of course the spring-pressed plungers 25 may be mounted in the flange 16 instead of in the hubs and the flange may be made thicker if necessary to receive the plungers. The plungers 25 may of course be replaced by balls or other thrust members.

For advancing or retracting the drums 20 axially pins 28 are disposed in the standards 11 in a position to engage the outer end surfaces of the hubs 23. The pins 28 project beyond the outer surfaces of the standards 11 and are engaged by knobs 29 which are threaded onto the ends of the shaft 14. When screwed tightly against the projecting outer ends of pins 28 as shown in Fig. 2 the knobs 29 press the pins 28 against the outer end surfaces of the hubs 23 and thereby slide the hubs axially against the force of the springs 26 and bring the surfaces 24 of the drums 20 into frictional engagement. Both drums will then rotate in unison when one of the drums is turned manually. One of the knobs 29 may have a left hand thread if desired so that both knobs are turned either toward or away from the operator for advancing or retracting the corresponding drums. Pins 30 on the knobs 29 and stops 31 may be provided to limit the movement of the knobs so as to prevent accidental damage to the apparatus and also to prevent the knobs from being removed completely from the shaft 14.

The webs 22 are formed with annular flanges 32 which are accessible to the fingers of an operator for turning the drums from the two sides of the slide rule.

A sight glass 35 which may be of the magnifying type having a hairline 36 is attached to the peripheral surfaces of the annular members 12 by suitable means such as bolts 37 which may extend through elongated slots 38 in the members 12 to permit adjustment of the glass to conform to the normal line of sight of the operator.

It is to be understood of course that the drums 20 may be provided with any standard type of mathematical scales.

In the operation of this device when both knobs 29 are screwed against the outer ends of the pins 28 the drums 20 are both advanced toward the center to bring their adjacent edges 24 into frictional engagement. In this condition the drums may be turned in unison by pressing the fingers against the annular web 33 or the flange 32 of either of the drums, the friction of the contacting surfaces 24 being sufficient to overcome the drag of the spring-pressed plungers 25. This may be done by either hand and from either side of the slide rule.

When it is desired to release one of the drums for independent operation, the knob 29 on that side of the device which is most convenient to the operator is rotated in a direction to retract the knob from the outer ends of the pins 28 and permit the hubs 23 to be retracted axially by the springs 26 with corresponding separation of the contacting surfaces 24 as shown in Fig. 3. Both drums are now held in set positions by the friction drag of the plungers 25. Either drum however may be rotated independently by grasping the flange 32 of that drum with the fingers. Since there is no friction contact between the drums when the surfaces 24 are separated, the turning of either drum does not disturb the setting of the other.

When it is desired again to operate both drums in unison, the knob 29 which was retracted is again tightened so as to force the surfaces 24 again into frictional engagement.

It is to be noted that this operation may take place from either side and hence either the right hand or the left hand may be used as desired. In either case the drums may be operated in unison or independently by adjusting one of the knobs 29 only.

In the embodiments shown in Figs. 4 and 5 the construction is generally similar to that described above. In this embodiment however the drums 40 are provided with hubs 41 which are secured rigidly to bearing sleeves 42. The bearing sleeves 42 are longer than the hubs 41 and therefore provide a more stable support for the rotating drums. In this embodiment a shaft 43 is secured by screws 46 to stationary knobs 45 which are attached by screws 47 to supporting standards 44. The knobs 45 are recessed to receive the sleeves 42. A central flange 48 is disposed on the shaft 43 and spring-pressed plungers 49 urge the hubs 41 away from the central flange 48 as in the case of Figs. 1 to 3. In this embodiment pins 50 are disposed in suitable bosses 51 in the standards 44 and engage cam surfaces 52 in discs 53 which are journaled for rotation about hubs 54 formed on the standards 44 and are provided with actuating handles 55. When the discs 53 are shifted in one direction by the handle 55, the cam surfaces 52 force the pins 56 against the surfaces of the corresponding drums 40 and cause the drums to be shifted axially toward the central flange 48, thereby bringing the peripheral edges of the drums into frictional engagement for operation in unison as above described. When the drums are to be released for independent operation one of the handles 55 is shifted in the opposite direction to thereby rotate the disc 53 and shift the cam surfaces 52 in a direction to release the pins 50 and allow retraction of the drum in response to the action of the spring-pressed plungers 49.

In this embodiment the operation is identical with that of Figs. 1 to 3 except that the knobs 45 are stationary and the drums are advanced or retracted by shifting the levers 55. This, as in the previous case, may be done with either hand and from either side of the device.

It is to be understood of course that various changes and modifications may be made as will be apparent to a person skilled in the art.

What is claimed is:

1. A rotary slide rule comprising a fixed shaft, a pair of drums having peripheral surfaces carrying slide rule scales and having hubs mounted for independent rotation on said shaft, a fixed flange on said shaft between said hubs, means exerting a friction drag between each hub and said flange, friction means coupling said drums for rotation in unison, and means positioned adjacent each of said drums to retract said adjacent drum axially for releasing said friction coupling means and thereby freeing said drums for independent rotation.

2. A rotary slide rule comprising a pair of drums having peripheral surfaces carrying slide rule scales, a fixed shaft, means mounting said drums on said shaft for independent rotary movement and for limited axial movement, a fixed member carried by said shaft between said drums, frictional drag means cooperating between each drum and said fixed member to hold said drums independently in set positions, means for advancing each of said drums axially on said shaft toward said fixed member, and friction coupling means effective when said drums are both so advanced to cause said drums to operate in unison.

3. A rotary slide rule comprising a pair of drums having peripheral surfaces carrying slide rule scales, a fixed shaft, means mounting said drums on said shaft for independent rotary movement and for limited axial movement, a fixed member carried by said shaft between said drums, frictional drag means cooperating between each drum and said fixed member to hold said drums independently in set position, and means for advancing said drums axially on said shaft into mutual contact for operation in unison.

4. A rotary slide rule comprising a pair of drums having peripheral surfaces carrying slide rule scales, a fixed shaft, means mounting said drums on said shaft for independent rotary movement and for limited axial movement, a fixed member carried by said shaft between said drums, frictional drag means cooperating between each drum and said fixed member to hold said drums independently in set positions, control means for advancing and retracting each of said drums axially on said shaft into or out of mutual contact for operation in unison or for independent rotation, said control means being symmetrically arranged on the respective sides of said rule for operation with equal facility by either hand of the operator.

5. A rotary slide rule comprising a pair of drums having peripheral surfaces carrying slide rule scales and having hubs, a fixed shaft on which said hubs are journaled for independent rotation, a central flange mounted on said shaft between said hubs, spring-pressed members carried by the respective hubs and engaging opposite sides of said flange to exert a frictional drag on the respective drums and biased to urge said drums apart axially, said drums having surfaces to be brought into contact for operation in unison when said drums are both advanced toward said central flange, and releasable means on each side of said slide rule engaging the respective drums to hold said drums advanced with said surfaces in contact, said last means being symmetrically arranged on the respective sides for operating with either hand of the operator.

6. A rotary slide rule comprising a pair of drums having peripheral surfaces carrying slide rule scales and having hubs, a stationary shaft having a central flange rigidly affixed thereto, said hubs being mounted on said shaft on opposite sides of said flange for rotational and limited axial movement, spring-pressed members carried by each of said hubs engaging said flange for exerting a frictional drag thereon and tending to urge said drums apart axially, supporting standards for said shaft, plungers carried by said standards adapted to cause axial movement of said drums toward said central flange for bringing the adjacent surfaces thereof into frictional engagement, members carried by said standards for limited rotation thereon, said members having means for advancing or retracting said plungers for thereby engaging or disengaging said drums for unitary or independent rotation.

7. A rotary slide rule comprising a pair of drums having peripheral surfaces carrying slide rule scales and having hubs, a stationary shaft having a central flange rigidly affixed thereto, said hubs being mounted on said shaft on opposite sides of said flange for rotational and limited axial movement, spring-pressed members carried by each of said hubs engaging said flange for exerting a frictional drag thereon and tending to urge said drums apart axially, supporting standards for said shaft, plungers carried by said standards and adapted to cause axial movement of said drums toward said central flange for bringing the adjacent surfaces thereof into frictional engagement, and a knob threaded onto each end of said shaft and adapted to engage said plungers for advancing or retracting the same.

8. A rotary slide rule comprising a pair of drums having peripheral surfaces carrying slide rule scales and having hubs, a stationary shaft having a central flange rigidly affixed thereto, said hubs being mounted on said shaft on opposite sides of said flange for rotational and limited axial movement, spring-pressed members carried by each of said hubs engaging said flange for exerting a frictional drag thereon and tending to urge said drums apart axially, supporting standards for said shaft, plungers carried by said standards and adapted to cause axial movement of said drums toward said central flange for bringing the adjacent surfaces thereof into frictional engagement, a ring rotatably mounted on each of said standards, said rings having cam surfaces engaging said plungers for advancing or retracting the same, and means for shifting said rings for engaging or disengaging said drums for unitary or independent rotation.

9. A rotary slide rule comprising two drums bearing slide rule scales on their peripheries and having zones of frictional contact on their adjacent parallel surfaces, a horizontal shaft having a flange fixed in median position thereon, said drums being rotatably and slidably mounted on said shaft on opposite sides of a flange, means including said flange to exert a friction drag on said drums, and means for shifting said drums into mutual frictional engagement for simultaneous rotation as a unit or for disengaging the said drums for separate rotation independently of each other, said drums and shifting means being bilaterally symmetrical with respect to a reference plane bisecting the central axis of rotation at right angles, so that every operating manipulation of said drums and shifting means on one side of the said reference plane of symmetry may be alternately performed in like manner on the opposite side of the said reference plane of symmetry.

10. In a rotary slide rule, a rigid horizontal shaft bearing at its midpoint and affixed thereto a double-faced thrust flange, mathematical scale bearing drums having hubs rotatably and slidably mounted on opposite sides of said flange, spring means to retract both of said drums from said flange, said drums having friction surfaces which, when in mutual contact, enable them to be rotated as a unit, and manual means for advancing each drum toward said flange, the relative thickness of the said thrust flange and lengths of the hubs of the said drums being such that when one drum is drawn away from the flange so as to break their frictional contact, the other drum does not follow, and when the two drums are in firm frictional contact their hubs do not seize and bind the thrust flange.

11. In a rotary slide rule, a pair of support standards, a horizontal shaft rigidly mounted on, affixed to and having its ends extending beyond said support standards, a flange rigidly affixed to the said shaft at its midpoint, two mathematical scale bearing drums having hubs rotatably and slidably mounted upon the said shaft on opposite sides of said flange, said drums having zones of frictional contact surfaces on their adjacent faces, a plurality of spring-actuated thrust members so disposed about the axis in the hub zones of the said drums as to thrust the said drums away from the said flange and from each other, a plurality of movable thrust pins of equal length extending through each of the said vertical support standards and contacting said hubs, a circular ring on the exposed outer face of each drum adapted to be manipulated by the operator's fingers and having means contacting said thrust pins for shifting said drums into frictional contact for operation in unison.

References Cited in the file of this patent

UNITED STATES PATENTS

| | | |
|---|---|---|
| 93,849 | Wright | Aug. 17, 1869 |
| 207,487 | Bogue | Aug. 27, 1878 |
| 1,158,854 | Rings | Nov. 2, 1915 |
| 1,279,798 | Warman | Sept. 24, 1918 |
| 1,400,363 | Kennedy et al. | Dec. 13, 1921 |
| 1,409,583 | Robinson | Mar. 14, 1922 |
| 1,459,279 | Butcher | June 19, 1923 |
| 1,597,483 | Ritow | Aug. 24, 1926 |
| 1,645,009 | King | Oct. 11, 1927 |

FOREIGN PATENTS

| | | |
|---|---|---|
| 763,544 | France | Feb. 12, 1934 |